United States Patent [19]

Simpson et al.

[11] 4,434,357
[45] Feb. 28, 1984

[54] APPARATUS FOR HEATING ELECTRICALLY CONDUCTIVE FLOWABLE MEDIA

[75] Inventors: David P. Simpson, Chester; Robert Stirling, Wirral, both of England

[73] Assignee: The Electricity Council, England

[21] Appl. No.: 224,855

[22] Filed: Jan. 13, 1981

[30] Foreign Application Priority Data

Jan. 21, 1980 [GB] United Kingdom ............. 8001996

[51] Int. Cl.³ .................... H05B 3/60; A23L 3/32
[52] U.S. Cl. ................................. 219/291; 99/451; 165/61; 210/748; 219/288; 219/295; 426/237; 426/244; 426/247
[58] Field of Search ............... 219/284, 289, 288, 291, 219/295; 99/451; 426/237, 239, 244, 247, 520–522; 210/748; 165/61

[56] References Cited

U.S. PATENT DOCUMENTS

| | | | |
|---|---|---|---|
| 918,531 | 4/1909 | Goucher | 99/451 X |
| 936,328 | 10/1909 | Kuhn | 426/247 X |
| 1,147,558 | 7/1915 | Shelmerdine | 99/451 X |
| 1,333,633 | 3/1920 | Rudd | 99/451 X |
| 1,432,124 | 10/1922 | Rudd | 99/451 X |
| 2,052,396 | 8/1936 | Getchell | 219/284 X |
| 2,081,243 | 5/1937 | Macy | 99/451 |
| 2,550,584 | 4/1951 | Mittelmann | 219/284 X |

FOREIGN PATENT DOCUMENTS

| | | | |
|---|---|---|---|
| 103122 | 1/1938 | Australia | 219/291 |
| 1088166 | 9/1960 | Fed. Rep. of Germany | 219/284 |

OTHER PUBLICATIONS

"Pastuerization of Milk by Electricity", by F. H. McDowall, The New Zealand Journal of Science and Technology; Feb. 1929, pp. 275–291.

Primary Examiner—A. Bartis
Attorney, Agent, or Firm—Beveridge, De Grandi & Kline

[57] ABSTRACT

An apparatus for heating an electrically conductive fluid ohmically by passing an electric current through the fluid between electrodes spaced along a pipe through which the fluid flows. The pipe has an electrically insulating internal liner and is cooled, e.g. by cooling water flowing through a cooling jacket between inner and outer skins of the pipe. The inner skin supports the liner and is perforated to allow intimate cooling of the liner. The cooling prevents heating of the fluid in a layer immediately adjacent the internal liner to such a temperature that the medium would foul the liner.

17 Claims, 6 Drawing Figures

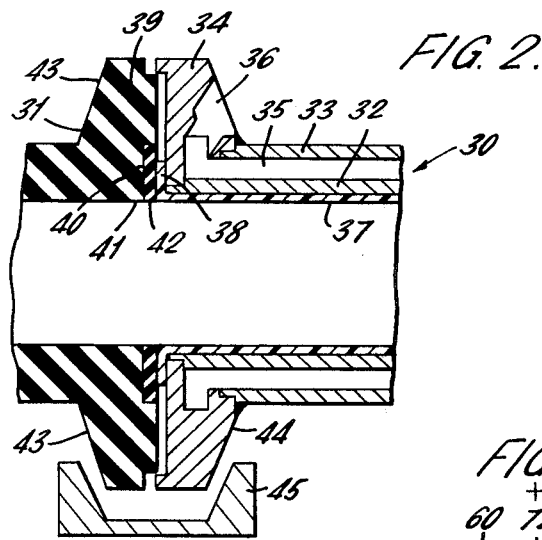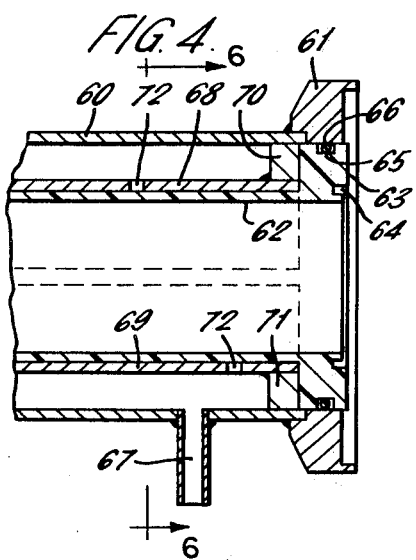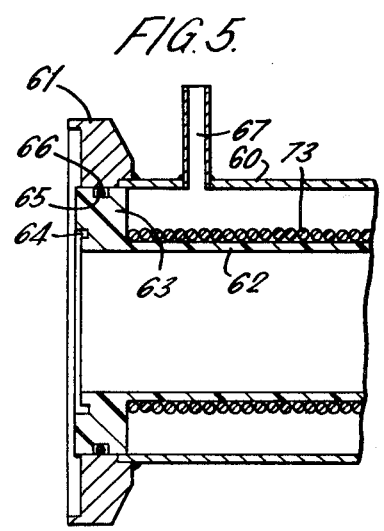

APPARATUS FOR HEATING ELECTRICALLY CONDUCTIVE FLOWABLE MEDIA

BACKGROUND OF THE INVENTION

This invention is concerned with apparatus for heating electrically conductive flowable media, typically liquids. It is commonly necessary to heat flowable media to elevated temperatures, for example to perform a chemical reaction or, where the flowable medium is a foodstuff, to cook or sterilise the foodstuff. Conventional methods of applying heat to flowable media such as liquids include plate heat exchangers, autoclaves, steam or hot water-jacketed vessels and hot-air ovens. Such conventional methods may provide certain problems arising, for example, from the uneven temperature distribution established in the media according to the laws of heat conduction from a hot surface into the cold medium. Further, the rate of heat input into the medium is dependent on the surface area of the heating element in contact with the medium and the maximum temperature to which the medium immediately adjacent the heating surface can be raised without some deleterious effect. For example, in the heating of liquid foodstuffs such as dairy products requiring pasteurisation or sterilisation, the product is liable to protein denaturation at an excessively hot heat exchange surface. Furthermore, the surface area of the heat exchanger is also restricted since high surface areas entail fine mesh heat exchange structures which restrict flow of the media and can readily be fouled by viscous media or media with solid particles entrained. Furthermore, fouling of the heat exchange surface can occur due to the excessive temperature at the heat exchange surface, which again leads to a diminished heat transfer rate from the fouled surface which progressively compounds the problem. Fouling also increases the pressure drop required across the heat exchanger to ensure flow of the medium.

Canned produce containing meat, vegetable or fruit components in a liquid base are commonly autoclaved to achieve sterility. Over-cooking can occur at the can's surface with consequent loss of texture, flavour and nutritional value. Further, certain delicate foods containing, for instance, a yogurt or starch base, could benefit from a sterilising process offering very rapid heating rates which themselves can be difficult to achieve with known hot surface heat exchanger techniques.

It is already known to heat flowable media such as liquids by causing an electric current to flow directly in the media between pairs of electrodes. Such direct electrical ohmic heating of the medium can permit high rates of heat input to the medium, enabling relatively rapid heating rates. The basic problem of heating by conduction from a hot heat exchanger surface is also obviated. Proposals for ohmically heating liquids, specifically for pasteurising milk, are described in the article entitled "Pasteurization of Milk by Electricity", by F. H. McDowall, pages 275 to 291 of The New Zealand Journal of Science and Technology, February 1929. The "Electro-Pasteur" described in this article ohmically heats milk by electric currents flowing between electrodes spaced at intervals along a pipe through which the milk is flowing. Thus, the electric current flows parallel to the direction of flow of the milk.

SUMMARY OF THE INVENTION

According to the present invention, apparatus for heating an electrically conductive flowable medium comprises pipe means through which the medium can be arranged to flow, the pipe means being made of or internally lined with a material having an electrical conductivity no greater than that of the medium, at least two electrodes spaced apart along the pipe means and arranged to make electrical contact with medium flowing therethrough, supply means for applying an alternating electrical supply across said electrodes so that alternating current can flow in the medium between the electrodes, and means for cooling the internal wall surface of the pipe means so as to remove heat from the medium immediately adjacent said internal surface.

It has been found that, with ohmic heating apparatus of the kind where the heating current flows in the medium parallel to the direction of flow of the medium in a pipe, especially under extreme conditions, some fouling of the internal wall surfaces of the pipe can take place. It is believed that this occurs because of the viscous drag exerted on the medium by the pipe walls which causes the medium immediately adjacent the walls to be moving along the pipe rather more slowly than the medium in the central region of the pipe. As a result, even though the distribution of electrical current across the cross-section of the pipe may be relatively constant, the medium immediately adjacent the walls of the pipe experiences the electrical current for a longer period of time than the medium flowing down the central part of the pipe which flows between the upstream and downstream electrodes more quickly. As a result, the medium immediately adjacent the walls of the pipe is heated more than the medium in the centre of the pipe and fouling of the walls can occur. In the apparatus of the present invention, means are provided for cooling the internal wall surface of the pipe means so as to counteract this tendency of the medium immediately adjacent the internal surface of the pipe means to be excessively heated. By suitably cooling the wall surface of the pipe means, it has been found that fouling of the surface can be substantially completely eliminated.

Preferably, the pipe means comprises at least one length of double-walled pipe providing a jacket between the walls with an inlet and an outlet, and the cooling means comprises a supply of cooling fluid and means for passing the cooling fluid through the jacket to cool the internal surface of the pipe.

In one example, the pipe means is formed principally of metal and has an electrically insulating internal liner. The liner may be an inner pipe section of plastic material fitting inside the metal wall of the pipe means and having outwardly directed annular flanges at each end fitting over the ends of the metal walls of the pipe means for providing at the end of the pipe means a fluid-tight seal, when the apparatus is in use, electrically isolating the metal parts of the pipe means from the medium flowing through it. Then, where the double-walled pipe is made of metal having the plastics liner inside the inner metal wall, the inner metal wall may be perforated to allow intimate contact between the liner and cooling fluid in the jacket. It has been found that there is a tendency for the plastic inner liner to distort somewhat when heated by the hot medium flowing through the pipe means during operation of the apparatus. The plastic liner can then become displaced somewhat from the inner metal wall of the jacketed pipe means. The perforations in the inner wall of the pipe means ensure that intimate contact between the cooling fluid and the plastic liner is maintained in spite of such a displacement.

The plastic for the liner is preferably pretreated to age the material before being machined into the desired shape for the liner, so as to reduce subsequent changes in the dimensions of the liner when the apparatus is in use. The pretreatment may consist of aging the material in an aqueous medium for forty-eight hours at 140° C.

In another example, the pipe means comprises an inner liner pipe section of an electrically insulating material and an outer jacket pipe section of metal, the inner liner pipe section being sealed at its ends to the outer jacket pipe section to provide the cooling jacket between the inner and outer sections. Then preferably, the apparatus includes supporting means for supporting the inner liner pipe section against over pressure of fluid in the pipe.

The supporting means may comprise a spiral of wire wound around the inner liner section and fastened at its ends so that tension in the wire provides the support.

Alternatively, the supporting means may comprise a pair of axially divided pipe portions fitting around the inner liner section and clamped together to provide the support. The pair of pipe portions are preferably perforated to allow cooling fluid in the jacket to make intimate contact with the outer surface of the liner section.

The liner may be of fluorinated ethylene polymer.

Examples of the present invention will now be described with reference to the accompanying drawings.

BRIEF DESCRIPTION OF THE DRAWINGS

FIG. 2 illustrates a junction between one end of a pipe section from FIG. 1 illustrating the present invention and an electrode housing;

FIGS. 4 and 5 are fragmentary sectional views illustrating two further arrangements of the pipe sections.

DETAILED DESCRIPTION OF THE INVENTION

Figure 1:
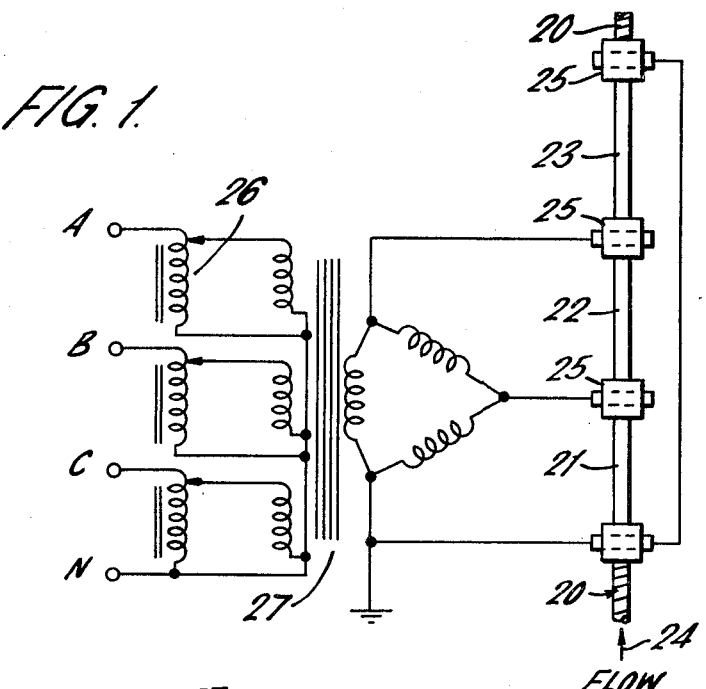
FIG. 1 illustrates an apparatus for electrically heating a flowable medium and in which the present invention can be embodied.

FIG. 1 illustrates an example of apparatus for electrically heating flowable media in which the present invention can be embodied. In FIG. 1, there is generally indicated at 20 a pipe for the flowable medium which is to be heated. The medium is typically a liquid, for example a flowable foodstuff which is to be heated for cooking or sterilising. The pipe 20 is connected, in use, to means such as a positive displacement pump for producing a flow of the medium in the direction of arrow 24 through the pipe 20. Such means might comprise a pump conveying the foodstuff from one vat to another in a foodstuff treatment process. As shown in FIG. 1, the pipe 20 has sections 21, 22 and 23 which are made so that the material flowing inside these sections is electrically insulated from the outside of the pipe. To achieve this the pipe sections may be made entirely from insulating materials, or they may be internally lined with an insulating material. It is preferable that the insulating material employed is a "good" insulator, i.e. having a very low electrical conductivity, although the apparatus can be made to work provided the conductivity of the insulating material employed is less than that of the medium flowing in the pipe.

The insulating pipe sections 21, 22 and 23 space apart four electrodes 25. The electrodes 25 are each arranged to have electrode surfaces which are exposed to medium flowing in the pipe 20. A three-phase autotransformer 26, connected to a three-phase step up transformer 27, is arranged to provide a variable alternating voltage supply, for example from the mains three-phase electricity supply at 440 V. The delta-connected secondary windings of the transformer 27 are connected to the electrodes 25, with one terminal of the secondary windings connected to earth and to the electrodes at either end of the heater portion of the pipe 20, i.e. the uppermost and lowermost electrodes 25 in FIG. 1. The other two terminals of the secondary windings are connected to respective ones of the two intermediate electrodes 25. It can be seen, therefore, that a different phase of alternating voltage is applied between each adjacent pair of electrodes 25, but in each case the R.M.S. voltage applied across the electrodes is the same. Having the outer two electrodes earthed minimises any risk of current flowing in the medium either before the inlet or after the outlet of the heating portion of the pipe 20.

The form and construction of the electrodes 25 is important. It is important to ensure that the electrodes are made of a material which is not excessively eroded by electrolytic action during the heating process and does not introduce undesirable impurities into the medium being heated. Electrodes made of graphite impregnated with resin to eliminate porosity have been found to work satisfactorily. However, it is preferred if the electrodes are formed with a platinum coating exposed to the medium. The shape of the electrode surfaces exposed to the medium in the pipe 20 is also important. Electrodes in the form of annular collars flush with the interior surface of the pipe 20 have been made to work. However, it is preferred for the electrodes to be shaped as cylinders extending transversely of the axis of the pipe and mounted in enlarged cavities in the pipe. A preferred form of electrode and housing therefor is described in more detail and claimed in the co-pending application No. 224,854, filed on Jan. 13, 1981.

In order to prevent or reduce the risk of the interior surfaces of the pipe sections 21, 22 and 23 becoming fouled by the medium flowing through them, means are provided for cooling the internal surfaces of these sections. Referring to FIG. 2, the junction is illustrated between an end of a pipe section 30 and a housing 31 for one of the electrodes 25. The pipe section 30 corresponds to one of the sections 21, 22 and 23 illustrated in FIG. 1 and it has a correspondng junction at its other end to the next electrode housing along the heating section of the pipe 20. The pipe 30 has an inner skin 32 and an outer skin 33 which are mounted coaxially on end flange portions 34 so as to define an annular space 35 between the two skins extending substantially the length of the pipe section 30. The annular space 35 constitutes a cooling jacket and the end flange portion 34 is provided with a bore 36 communicating with the interior of the jacket 35. A similar bore is provided in the end flange at the other end of the pipe section 30. Fluid connections can be made to the bores 36 to enable a cooling fluid, such as cooling water, to be passed through the jacket 35.

The inner and outer skins 32 and 33 and the end flange portions 34 are all formed of metal. In order to electrically insulate these metal parts of the pipe section 30 from the medium flowing inside the pipe section, an internal liner 37 is provided made of an electrically insulating material, such as a suitable plastic material. The liner is formed as an inner pipe, relatively thin-walled compared with the wall thickness of the skins 32 and 33, and fitting snugly inside the bore of the inner skin 32. At either end the liner 37 is formed with outwardly extending annular flanges 38 which fit closely around the ends of the pipe section 30.

As shown in FIG. 2, the pipe sections 30 of the apparatus of FIG. 1, are coupled at each end to electrode housings 31 in which the electrodes 25 are mounted. The housings 31 are made of an electrically insulating material, such as P.T.F.E., and are provided with flanges 39 arranged to mate with the end flanges 34 of the pipe sections 30. Each flange 39 has an annular recess 40, extending from the inner edge 41 of the flange, in which is located a sealing gasket 42 of a suitable electrically insulating sealing material such as silicone rubber. The gasket 42 is effective to provide a fluid-tight seal between the inner portion of the flange 39 of the electrode housing 31 and the flange 38 of the liner 37 of the pipe section 30, so as to prevent any leakage of the medium being heated around the flange 38 where it might make electrical contact with the metal part of the pipe section 30. It is desirable to ensure that the gasket 42 is correctly shaped and sized so that when the housing 31 and the pipe section 30 are clamped together, the gasket 42 forms a substantially crevice-free seal between the mating portions of the housing 31 and the pipe section 30.

As illustrated in FIG. 2, the flange 39 of the housing 31 and the flange portion 34 of the pipe section 30 are both provided with annularly-extending sloping shoulder surfaces 43 and 44 respectively which can co-operate with a standard hinged three-section quick release clamp, of which part is illustrated at 45 in the figure. The clamp 45 can be tightened around the flanges 39 and 34 to clamp the pipe section 30 firmly to the electrode housing 31. When clamped to the pipe section 30, a bore 46 in the housing 31 is aligned with the bore of the pipe section 30, and it will be noted that the internal diameter of the mating portion of the bore in the housing 31 is the same as the internal diameter of the liner 37 of the pipe section 30.

When the apparatus of FIG. 1, fitted with pipe sections as illustrated in FIG. 2, is operated, cooling water passes through the jacket 35 of the pipe section 30 via the inlet and outlet bores 36 in the end flange portions 34 and effectively cools the inner skin 32 and hence the liner 37 in contact with it. As explained previously, this can serve to prevent or at least diminish the amount of fouling on the internal surface of the pipe section 30 resulting from excessive heating of medium immediately adjacent these internal surfaces.

Figure 3:
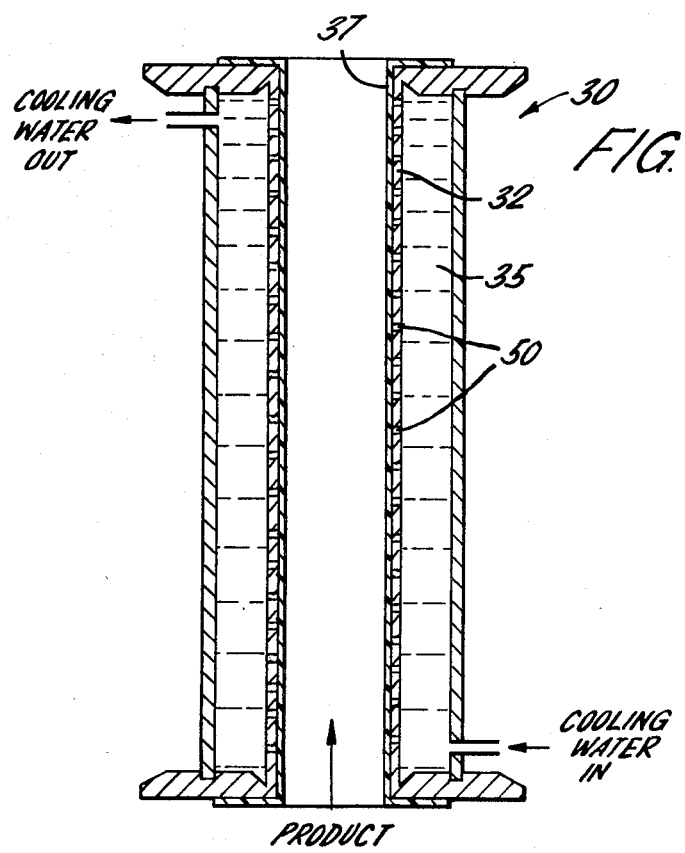
FIG. 3 illustrates a different preferred form of the pipe sections in FIG. 1.
Figure 6:
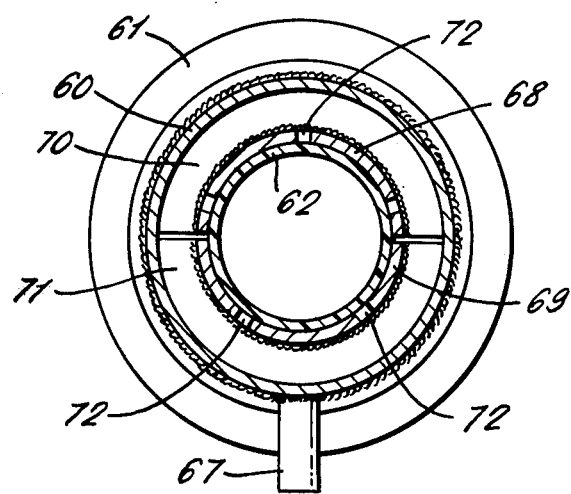
FIG. 6 is a sectional view taken along line 6—6 in FIG. 4.

FIG. 3 illustrates a preferred arrangement for the pipe sections 30 in which the inner skin 32 of the pipe section 30 is perforated to allow intimate contact between the cooling fluid in the jacket 35 and the liner 37. As explained previously, any distortion in the liner 37, possibly caused by the heat of the medium flowing in the pipe during the heating operation, might cause the liner 37 to distort away from the inner skin 32 of the metal parts of pipe section 30. However, the perforations 50 ensure that intimate contact is maintained between the skin 37 and the cooling liquid in the jacket 35.

Furthermore, in order to minimise the amount of distortion of the liner 37 resulting from the heat during operation of the apparatus, it is preferable to form the liner of a plastic material, preferably fluorinated ethylene polymer (F.E.P. from duPont), by pretreating the tube blank used for the liner before machining it to shape. The pretreatment consists essentially of aging the material in an aqueous medium for forty-eight hours at 140° C. and subsequently machining and fabricating the treated material into the tube with end flanges formed on the liner 37.

FIGS. 4 and 5 illustrate two further embodiments of pipe section having cooling jackets in the manner of the pipe section shown in FIG. 3. In each of FIGS. 4 and 5, an outer skin 60 of the jacket is preferably made of stainless steel and has welded to it tapered flanges 61 corresponding to the flange portions 34 of the FIG. 2 embodiment. Fitted inside each outer skin 60 is a liner 62 formed, for example, of PTFE. The liner 62 is fabricated from bar or tube stock, the outer and inner starting diameters of the stock being respectively greater than the bore in flanges 61 of the outer skin 60 and less than the intended final bore size of the complete pipe sections, typically 25 mm. In fabricating the liner 62, the bar or tube stock is first bored out to the intended finished pipe section bore size, e.g. 25 mm, and then fitted on a mandril, where the centre portion of the stock is turned down to form a thin walled tube with end flanges 63 as illustrated in FIGS. 4 and 5. A groove 64 may be machined into the end face of the flanges 63 to provide a seating for a standard seal for sealing the pipe section to an adjacent electrode housing as described previously. An IDF standard T-seal for use with foodstuffs may be used for this purpose. The outer diameter of the end flanges 63 is machined down to fit inside the bore of the outer casing 60 with its end flanges 61. The outer faces of the flanges 63 are also provided with annular grooves 65 for conventional O-ring seals 66 to provide a watertight seal between the outer casing or jacket 60, 61 and the liner 62, 63.

Connections 67 are provided through the outer casing 60 to provide a flow of cooling water for cooling the liner 62.

The thin liner 62, commonly made of PTFE, will generally require strengthening against the pressure of the fluid flowing along the pipe section. FIG. 4 shows one arrangement for strengthening the liner 62 similar to that illustrated in FIG. 3. A pair of perforated half tubes 68 and 69 are provided having a bore carefully matched to the outer diameter of the liner 62 to fit around the liner as illustrated in FIG. 4. The half tubes 68 and 69, commonly made of brass or stainless steel, are held in place around the liner 62 to support the material of the liner by means of half flanges 70 and 71 which may be soldered or welded to the outer circumference of the respective half tubes. The flanges 70 and 71 are sized to fit between the half tubes 68, 69 and the inner surface of the outer casing 60 so as to press the half tubes firmly against the liner 62. The half tubes 68 and 69 are perforated, as at 72 to allow direct contact between the cooling fluid contained in the jacket 60 of the pipe section and the outer surface of the liner 62. It will be appreciated that good thermal contact between the cooling fluid and the material of the liner 62 is essential to counteract the thermal resistance provided by the thickness of the liner.

FIG. 5 illustrates an alternative arrangement for supporting the wall of the liner 62 comprising a spiral of, for example, tinned copper wire 73 wound on the thinned wall part of the liner 62. The wire 73 is conveniently wound on the outside of the turned down portion of the liner on a lathe whilst the liner is still mounted on its mandril following machining. The wire may subsequently be soldered to secure it in place or attached to the inner sides of flanges 63 under tension.

It will be appreciated that the completed liner assembly, with either the perforated half tubes 68, 69 of FIG. 4, or the wire reinforcement 73 of FIG. 5, can be inserted into the outer casing 60 to form a completed pipe section. The liner assembly is free to float axially in the outer casing, but will of course be located in use by the electrode housings attached at each of the flanges 61. Electrode housings would themselves be formed with matching sealing means to co-operate with the seals in the grooves 64 of the flanges 63. Apart from PTFE, the liners 62 may be formed of FEP, or enamel or glass. Enamel or glass liners require less cooling than plastic tubes because they can be made with thinner wall thicknesses.

In some arrangements, where less effective cooling is needed, the cooling may be provided by a spiral of copper tube wound around the outside of the pipe section, the pitch of the spiral being selected to give the required degree of cooling. With such a spiral of copper tube, the double wall construction of the pipe sections is not necessary.

What is claimed is:

1. Apparatus for heating an electrically conductive flowable medium, comprising pipe means through which the medium can be arranged to flow, the pipe means having an internal surface of a material having an electrical conductivity no greater than that of the medium, at least two electrodes spaced apart along the pipe means and arranged to make electrical contact with medium flowing therethrough, supply means for applying an alternating electrical supply across said electrodes so that alternating current can flow in the medium between the electrodes to heat the medium, and means for cooling the internal wall surface of the pipe means so as to remove heat from the medium immediately adjacent said internal surface to prevent heating of the medium in a layer immediately adjacent said internal surface to such a temperature that the medium would foul the internal wall surface.

2. Apparatus as claimed in claim 1 wherein the pipe means comprises at least one length of double-walled pipe providing a jacket between the walls with an inlet and an outlet, and said cooling means comprises a supply of cooling fluid and means for passing said cooling fluid through said jacket to cool the internal surface of the pipe.

3. Apparatus as claimed in claim 2 wherein the pipe means comprises an inner liner pipe section of an electrically insulating material and an outer jacket pipe section of metal, the inner liner pipe section being sealed at its ends to the outer jacket pipe section to provide said cooling jacket between the inner and outer sections.

4. Apparatus as claimed in claim 3 and including supporting means for supporting said inner liner pipe section against pressure of fluid in the pipe.

5. Apparatus as claimed in claim 4 wherein said supporting means comprises a spiral of wire wound around the inner liner section and fastened at its ends so that tension in the wire provides the support.

6. Apparatus as claimed in claim 4 wherein said supporting means comprises a pair of axially divided pipe portions fitting around the inner liner pipe section and clamped together to provide the support.

7. Apparatus as claimed in claim 6 wherein said pair of pipe portions are perforated to allow cooling fluid in said jacket to make intimate contact with the outer surface of the liner pipe section.

8. Apparatus as claimed in claim 2, wherein the pipe means is formed principally of metal and has an electrically insulating internal liner forming said internal surface.

9. Apparatus as claimed in claim 8 wherein the liner is an inner pipe section of plastic material fitting inside the pipe means and having outwardly directed annular flanges at each end fitting over the ends of the pipe means for providing at the ends of the pipe means a fluid-tight seal and, when the apparatus is in use, electrically isolating the metal parts of the pipe means from medium flowing through it.

10. Apparatus as claimed in claim 9, wherein the internal surface of the pipe is perforated to allow intimate contact between the liner and cooling fluid in the jacket.

11. Apparatus as claimed in claim 10 wherein the plastic for the liner is treated to age the material before being machined into the liner so as to reduce subsequent changes in the dimensions of the liner when the apparatus is in use.

12. Apparatus as claimed in claim 9 wherein the plastic for the liner is treated to age the material before being machined into the liner so as to reduce subsequent changes in the dimensions of the liner when the apparatus is in use.

13. Apparatus as claimed in claim 1 wherein the pipe means is formed principally of metal and has an electrically insulating internal liner forming said internal surface.

14. Apparatus as claimed in claim 13 wherein the liner is an inner pipe section of plastic material fitting inside the pipe means and having outwardly directed annular flanges at each end fitting over the ends of the pipe means for providing at the ends of the pipe means a fluid-tight seal and, when the apparatus is in use, electrically isolating the metal parts of the pipe means from medium flowing through it.

15. Apparatus as claimed in claim 4 wherein the plastics for the liner is treated to age the material before being machined into the liner so as to reduce subsequent changes in the dimensions of the liner when the apparatus is in use.

16. Apparatus as claimed in claim 14, claim 10, or claim 9 wherein the liner is of fluorinated ethylene polymer.

17. Apparatus as claimed in claim 16 wherein the plastic for the liner is treated to age the material before being machined into the liner so as to reduce subsequent changes in the dimensions of the liner when the apparatus is in use.

* * * * *